United States Patent
Wagener et al.

(10) Patent No.: US 7,172,755 B2
(45) Date of Patent: Feb. 6, 2007

(54) METHODS FOR MAKING FUNCTIONALIZED POLYMERS

(75) Inventors: Kenneth B. Wagener, Gainesville, FL (US); Timothy E. Hopkins, Gainesville, FL (US); James H. Pawlow, Gainesville, FL (US); Fernando J. Gomez, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 618 days.

(21) Appl. No.: 10/314,612

(22) Filed: Dec. 9, 2002

(65) Prior Publication Data

US 2003/0139556 A1    Jul. 24, 2003

Related U.S. Application Data

(62) Division of application No. 09/933,699, filed on Aug. 20, 2001, now Pat. No. 6,680,051.

(51) Int. Cl.
| | |
|---|---|
| *A61K 31/785* | (2006.01) |
| *A61K 38/00* | (2006.01) |
| *A61K 47/00* | (2006.01) |
| *C08F 4/80* | (2006.01) |
| *C08F 20/00* | (2006.01) |

(52) U.S. Cl. .............. 424/78.35; 424/78.31; 514/2; 514/772.4; 514/773; 526/171; 526/303.1; 526/304; 526/307.1

(58) Field of Classification Search .............. 526/93, 526/304, 171, 303.1, 307.1; 424/78.35, 78.31; 514/2, 772.4, 773
See application file for complete search history.

(56) References Cited

U.S. PATENT DOCUMENTS 5,659,049 A * 8/1997 Franson et al. ............ 548/400
5,659,055 A * 8/1997 Franson et al. ............ 554/88

* cited by examiner

*Primary Examiner*—Shengjun Wang
(74) *Attorney, Agent, or Firm*—Akerman Senterfitt; Nicholas Zachariades

(57) ABSTRACT

Polymers containing amino acid and/or polypeptide moieties in their backbones or pendant to their backbones are made by metathesis. A method of making an amino acid or polypeptide containing polymer includes the steps of: providing a amino acid, amino alcohol, or polypeptide-containing monomer; forming a reaction mixture by contacting the monomer with an agent capable of catalyzing the polymerization of the monomer into a polymer; and placing the reaction mixture under conditions that result in the formation of the polymer in reaction mixture.

13 Claims, 6 Drawing Sheets

Monomer 21                          Monomer 22

Monomer 23                          Monomer 24

Monomer 25                          Monomer 26 n,m > 2
x = 1,2,3,4........
R = any amino acid side chain

Momomer 27 n,m > 2
x = 1,2,3,4........
R = any amino acid side chain
y = 1,2,3,4,......

Momomer 28 n > 1
m > 2
y = 1,2,3,4,......

R = any amino acid side chain $R_1$ = any protecting group or H

Momomer 29 n > 1
m > 2
y = 1,2,3,4,......

R = any amino acid side chain $R_1$ = any protecting group or H

Momomer 30

Polymer 31 n,m > 2
x = 1,2,3,4........
R = any amino acid side chain

Polymer 32 n,m > 2
x = 1,2,3,4........
R = any amino acid side chain
y = 1,2,3,4,......

Polymer 33 n > 1
m > 2
y = 1,2,3,4,......
R = any amino acid side chain
$R_1$ = any protecting group or H Polymer 34 n > 1
m > 2
y = 1,2,3,4,......
R = any amino acid side chain
$R_1$ = any protecting group or H

METHODS FOR MAKING FUNCTIONALIZED POLYMERS

CROSS REFERENCE TO RELATED APPLICATION

The present application is a divisional of U.S. patent application Ser. No. 09/933,699 filed Aug. 20, 2001, now U.S. Pat. No. 6,680,051, entitled "Functionalized Polymers."

STATEMENT AS TO FEDERALLY SPONSORED RESEARCH

This invention was made with U.S. government support under grant DMR-9806492 awarded by the National Science Foundation. The U.S. government may have certain rights in the invention.

FIELD OF THE INVENTION

The invention relates generally the field of chemistry. More particularly, the invention relates to polymers containing amino acids and processes of making such polymers.

BACKGROUND

Polymers containing amino acid-based moieties are of interest for several reasons including their potential biological compatibility and biodegradability. Moreover, chiral amino acid-based polymers can have induced crystallinity, a property allowing such polymers to form higher ordered structures that exhibit enhanced solubility characteristics. These properties make such polymers ideal candidates for a variety of biomaterial applications, e.g., for drug delivery systems, biomimetic systems, biodegradable macromolecules, other biomaterials, and as chiral purification media. See, Birchall et al., Polymer 2001, 42, 375–389; Langer, R. Acc. Chem. Res. 2000, 33, 94–101; and Sanda, F. and Endo, T. Macromol. Chem. Phys. 1999, 200, 2651–2661.

Recently, Endo and coworkers have reported the synthesis of several branched and linear polymer systems containing amino acid moieties using acrylamide substrates (Sanda et al., J. Polym. Sci., Part A: Polym. Chem. 1997, 35, 2619–2629; and Murata et al., Macromolecules 1996, 29, 5535–5538); by the radical polyaddition of dithiols with diolefins (Koyama et al., Macromolecules 1998, 31, 1495–1500); as well as by the polycondensation of diols from amino alcohols and dicarboxylic acids (Koyama et al., J. Polym. Sci., Part A: Polym Chem. 1997, 35, 345–352). Circular dichroism showed that several of these polymers formed higher ordered structures. Koyama et al., Macromolecules 1998, 31, 1495–1500. In addition to the foregoing, Maynard and Grubbs have produced polymers containing amino acid moieties via the ring-opening metathesis polymerization (ROMP) of oligopeptide-substituted norbornenes, and have also copolymerized these monomers with penta(ethyleneoxide) substituted norbonenes to form water-soluble polymers. Maynard et al., Macromolecules 2000, 33, 6239–6248; Maynard, H. D. and Grubbs, R. H. Macromolecules 1999, 32, 6917–6924; and Maynard et al., J. Am. Chem. Soc. 2001, 123, 1275–1279.

Each of the foregoing methods has certain advantages and disadvantages for the production of particular types of amino acid-containing polymers. Thus, additional methods of making such polymers would advance the field. Methods that can be used with a wide range of different monomers and those that yield polymers in the form of strong films (e.g., so that they can fashioned into rigid devices) and/or with the amino acid moieties arranged in a regular pattern (e.g., for chiral separations) would be especially advantageous.

SUMMARY

What has been discovered is a new acyclic diene metathesis (ADMET) chemistry-based method of making polymers incorporating amino acids or polypeptides. In a first variation of this method, the amino acid or polypeptide moieties are incorporated within the backbone of the polymer to yield a linear copolymer (a linear functionalized polymer). In a second variation of this method, the amino acid or polypeptide moieties are covalently bonded to the backbone of the polymer to yield a branched polymer. Functionalized polymers prepared by this method could be used to produce a broad range of commercially important products such as chromatography reagents (e.g., for use in separatory reagents), biomimetics, biodegradable synthetic polymers, and drug delivery agents For example, branched functionalized polymers could be used as tissue culture substrates. Such polymers could also be used in an implantable medical device to modify the physiological response to the device. In another application, by incorporating only one chiral species (L or D; or R or S) of an amino acid onto the polymer backbone, the polymer could also be used to resolve enantiomers in a racemic mixture or to identify ligands that preferably interact with one chiral species.

Linear copolymers made from both amino acid-based monomers and hydrocarbon-based monomers could be used to make materials that biodegrade more quickly than conventional carbon-based linear polymers (e.g. polyethylene). Such materials could be fashioned into films for use in packaging, bags, and the like, that would quickly be degraded (e.g., by chemical or microorganism-mediated processes) in landfills. Similarly, such materials could be fashioned into medical implants designed to slowly degrade within a body. For example, the material could be impregnated with a drug for sustained release. It might also be fashioned into a scaffolding for applications in tissue engineering. In addition, drugs having improved pharmacodynamics could be made by incorporating biologically active oligopeptides within such polymers (e.g., to reduce the rate of degradation of the oligopeptide).

Accordingly, the invention features a method of making an amino acid-containing polymer. The method includes the steps of: (a) providing a monomer having the structure:

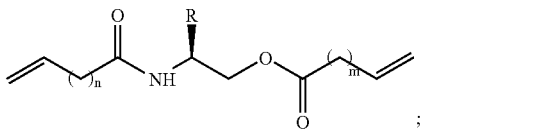
(monomer A)

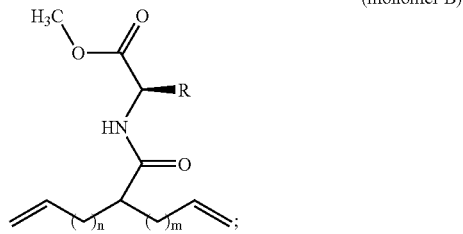
(monomer B)

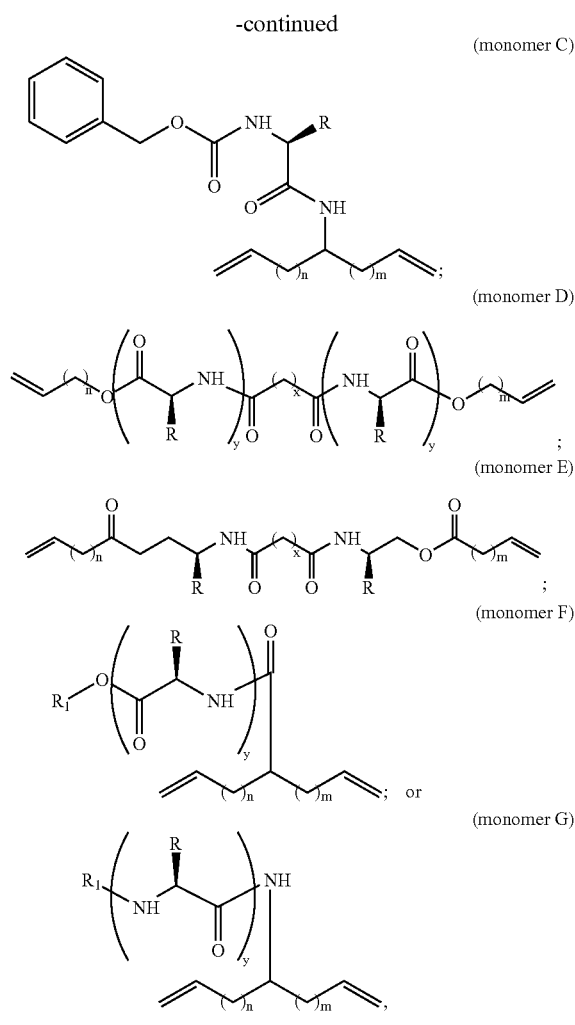

(monomer C)

(monomer D)

(monomer E)

(monomer F)

; or (monomer G)

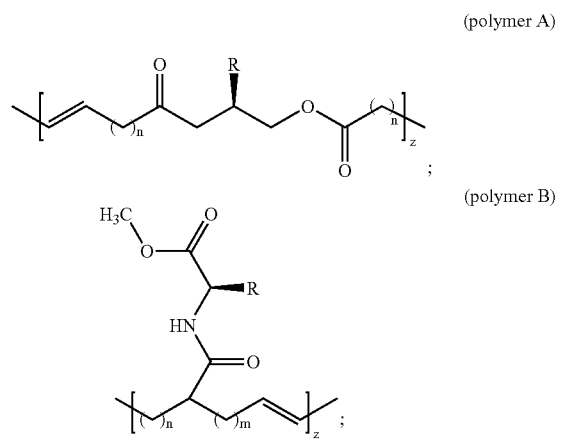

wherein y is an integer greater or equal to 1, n is an integer greater than 1, m is an integer greater than 2, x is an integer greater than or equal to 1, R is a moiety comprising a hydrogen atom and a carbon atom, and $R_1$ is any protecting group or H;

(b) forming a reaction mixture by contacting the monmer with an agent capable of catalyzing the polymerization of the monomer into a polymer having the structure of:

(polymer A)

(polymer B)

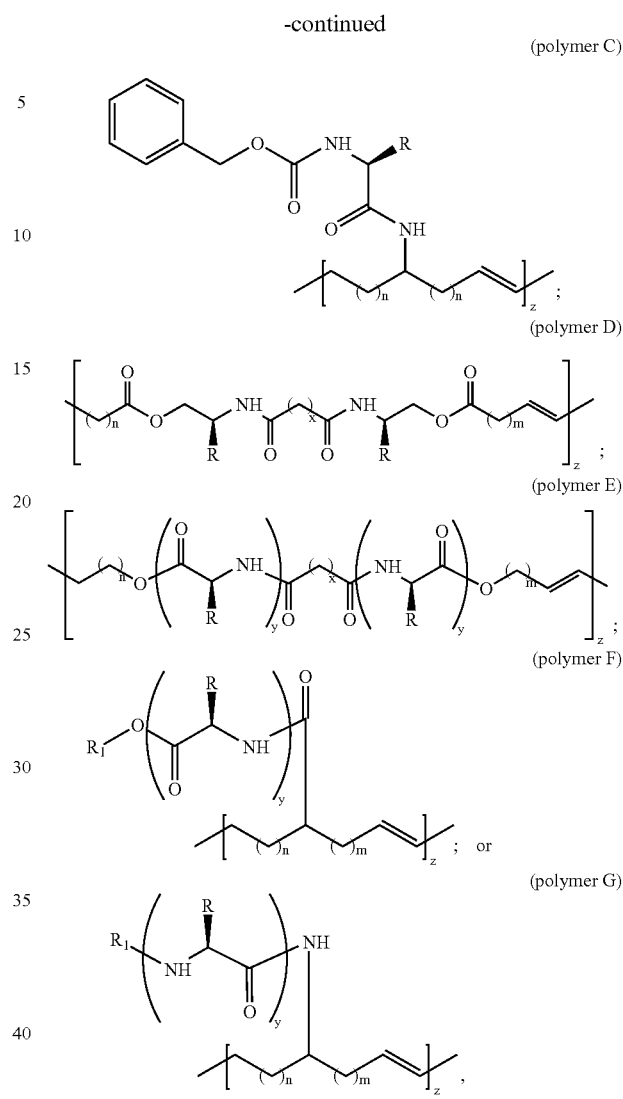

(polymer C)

(polymer D)

(polymer E)

(polymer F)

; or (polymer G)

wherein Z is an integer greater than 1;

(c) placing the reaction mixture under conditions that result in the formation of the polymer in reaction mixture.

In preferred variations of the method, the catalyst is a ruthenium-based catalyst (e.g., Ru*; see below). In other variations, n is an integer selected from 2, 3, 4, 5, 6, 7, 8, and 9; and m is an integer selected from 2, 3, 4, 5, 6, 7, 8, and 9. In certain embodiments of the invention n is equal to m. In other embodiments, n is not equal to m.

In various embodiments, R includes a moiety selected from: $CH_3$; $CH(CH_3)_2$; and $CH_2CH(CH_3)_2$. For example, R can include an amino acid side chain moiety, the amino acid being selected from the group consisting of: arginine, asparagine, aspartic acid, cysteine, glutamine, glutamic acid, glycine, histidine, isoleucine, lysine, methionine, phenylalanine, proline, serine, threonine, tryptophan, and tyrosine. R can also include a polypeptide.

The step (c) of placing the reaction mixture under conditions that result in the formation of the polymer in reaction mixture can include applying a vacuum force to the reaction mixture; flowing an inert gas over the reaction mixture; adding heat to the reaction mixture; or adding a solvent to the reaction mixture. The method of the invention can also include a step (d) of hydrogenating the polymer.

In another aspect the invention features a polymer having the structure of: polymer A, polymer B, polymer C, polymer D, polymer E, polymer F, or polymer G, wherein z is an integer greater than 1, y is an integer greater or equal to 1, n is an integer greater than 1, m is an integer greater than 2, x is an integer greater than or equal to 1, R is a moiety comprising a hydrogen atom and a carbon atom, and $R_1$ is any protecting group or H.

In various embodiments, R includes a moiety selected from: $CH_3$; $CH(CH_3)_2$; and $CH_2CH(CH_3)_2$. For example, R can include an amino acid side chain moiety, the amino acid being selected from the group consisting of: arginine, asparagine, aspartic acid, cysteine, glutamine, glutamic acid, glycine, histidine, isoleucine, lysine, methionine, phenylalanine, proline, serine, threonine, tryptophan, and tyrosine. R can also include a polypeptide.

In certain embodiments of the invention, the polymer is fashioned into a thin film. The polymer can also be a chiral polyolefin.

By the term "polypeptide" is meant any peptide-linked chain of amino acids, regardless of length.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In the case of conflict, the present specification, including definitions will control. The particular embodiments discussed below are illustrative only and not intended to be limiting.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

DETAILED DESCRIPTION

Figure 1:
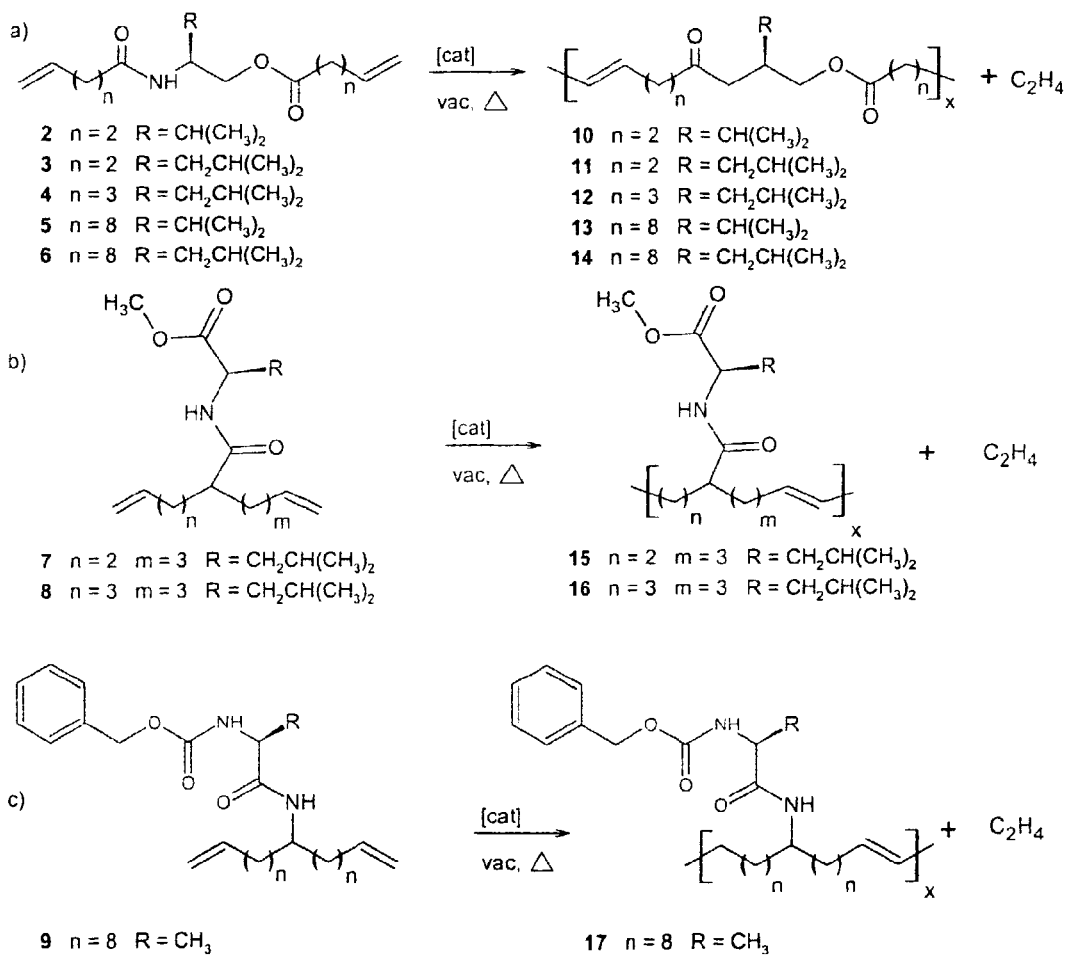
FIG. 1 is a schematic illustration of various monomers, polymers, and reactions of the invention. (a) linear amino alcohol polymers, (b) ester-terminated amino acid branched polymers, and (c) an amide-terminated amino acid branched polymer.

Polyolefins bearing amino acid groups are prepared by ADMET chemistry utilizing a suitable catalyst as illustrated in overview in the reactions shown in FIG. 1. In general, the reactions include two steps. The first step involves constructing either linear amino alcohol or branched amino acid diene monomers. The second step involves using ADMET to condense the monomers into a polymer product. Using the method, polyolefin polymers having amino acid groups positioned at precise locations within the polymer backbone or pendant to the backbone are produced. The amino acids incorporated into the monomers and polymers of the invention can be single amino acids or a chain of amino acids (i.e., a polypeptide). Thus, among other things, the invention provides (1) amino acid (or polypeptide)-funtionalized polymers, (2) methods of making such polymers, and (3) products incorporating such polymers.

The below-described preferred embodiments illustrate adaptations of the methods and compositions of the invention. Nonetheless, from the description of these embodiments, other aspects of the invention can also be made and/or practiced.

General Methods

The invention utilizes general techniques known in the field of polymer chemistry. General polymer chemistry concepts and methods relating to the invention are described in Polymer Handbook ($4^{th}$ Edition), eds., Brandup et al., New York, John Wiley and Sons, 1999; and Polymer Synthesis and Characterization: A Laboratory Manual, eds. Sandler et al., Academic Press, 1998. Concepts and methods relating more specifically to metathesis chemistry are described in Alkene Metathesis in Organic Synthesis. Springer-Verlag: Berlin, 1998 and Olefin Metathesis and Metathesis Polymerization, 2nd ed.; Academic: San Diego, 1997. ADMET is described with particularity in Lindmark-Hamburg, M. and Wagener, K. B. Macromolecules 1987, 20, 2949; Wagener et al., Macromolecules 1990, 23, 5155; Smith et al., Macromolecules 2000, 33, 3781–3794; Watson, M. D. and Wagener, K. B. Macromolecules 2000, 33, 3196–3201; Watson M. D. and Wagener K. B. Macromolecules 2000, 33, 8963–8970; and Watson M. D. and Wagener K. B. Macromolecules 2000, 33, 5411–5417.

Monomers

In methods within the invention, a diene molecule functionalized with an amino acid, amino alcohol, or chain of the foregoing is used as a monomer that is polymerized by ADMET. Any type of diene molecule functionalized with an amino acid or amino alcohol (or chain of the foregoing) that is capable of being polymerized by the metathesis method taught herein may be used as the monomer. Two or more (e.g., 3, 4, 5, 6, 7, 8 or more) different monomers of this type might also be used to produce co-polymers.

In the examples described below, dienes functionalized with an amino acid or amino alcohol in the backbone or pendant to the backbone of the diene are used. Particular examples of such functionalized dienes are shown in FIG. 1. Nonetheless, based on the teachings provided herein, it is expected that other molecules with similar structure would serve as suitable monomers as well. For example, alkynes functionalized with amino acids or amino alcohols might also be used in the invention by modifying conventional techniques of alkyne metathesis (e.g., acyclic diyne metathesis) according to the methods taught herein. For a description of alkyne metathesis chemistry see, e.g., Zhang et al., Youji Huaxue, 2001, 21:541–548; Winfried et al., Eur. J. Chem, 2001, 7:117–126; and Brizius et al., J. Am. Chem. Soc., 2000, 122:12435–12440. Preferred conditions for condensing such other molecules can be identified by performing the reactions described below under various reaction conditions to identify those under which a particular reaction proceeds efficiently. The conditions described herein can be used as a general guide in setting the ranges of the reaction conditions to be tested. In the experiments described below, standard ACS reagent grade chemicals were used as substrates and are available from Aldrich (St. Louis, Mo.) or Fisher Scientific (Hampton, N.H.).

Catalysts

The ADMET-mediated condensation of an amino acid or amino alcohol modified diene according to the invention is facilitated using a catalyst. Any catalyst compatible with the methods of the invention may be used. Numerous ADMET catalysts are known. Many of these, however, are not suitable for use with functionalized monomers as the functional groups can interfere with the active site of the catalyst molecule. For this reason, ADMET catalysts known to be tolerant of functional groups are preferred. For example, a tungsten halide in combination with an aluminum alkyl (e.g., tungsten hexachloride and ethyl aluminum dichloride) might be used.

Because of their well-known tolerance of functional groups and efficiency of catalysis, Ru-based catalysts are particularly preferred in the reactions of the invention. For example, 1,3-dimesityl-4,5-dihydroimidazol-2-ylidene)benzylidene ruthenium dichloride (elsewhere referred to herein as Ru* or catalyst 1) is particularly preferred because of its ability to efficiently catalyze the exemplary reactions described below. Scholl et al., Org. Lett. 1:953, 1999).

A number of other catalysts might be employed in the reaction was well. The suitability of such catalysts for a particular reaction within the invention can be determined empirically by substituting the Ru* catalyst used in one of the reactions described below with a test catalyst (i.e., one whose catalytic ability was not previously assessed in the reaction at hand). If the test catalyst catalyzes the reaction with sufficient activity that a measurable amount of polymer product is produced in the reaction within a reasonable amount of time (e.g., within 5 d), it is suitable. If it does not, it is not suitable. In general the more efficient the catalyst is, the more preferred it is for use in the invention.

Based on the data presented herein, it is thought that Ru-based catalysts having a structure similar to Ru* might also be particularly effective catalysts for use in the invention.

Several such structurally similar catalysts are known. These include well-defined Ru-alkylidene complexes bearing N-heterocyclic carbene ligands (e.g., those bearing phosphane or imidazolylidene ligands) and ruthenium vinylidene complexes bearing N-heterocyclic carbene ligands. See, Louie and Grubbs, *Agnew. Chem. Int. Ed.* 2001, 40:247; and Trnka and Grubbs, *Acc. Chem. Res.*, 2001, 34:18. For example, Bielawski et al., *Polymer,* 2001, 42:4939 describes 1,3-bis(2,4,6-trimethylphenyl)imidazol-2-ylidene and structurally similar compounds that might be used as the catalyst in some reactions within the invention. Other structurally similar catalysts are described in international patent application WO 00/43343 published Jul. 27, 2000. U.S. Pat. No. 6,048,993 also describes Ru-based catalysts with some similarity to Ru* that might be used in the invention.

Exemplary catalysts that might be used include, but are not limited to, neutral ruthenium or osmium metal carbene complexes that possesses metal centers that are formally in the +2 oxidation state, have an electron count of 16, are penta-coordinated, and are of the general formula I. Other catalysts that might be used include, but are not limited to, cationic ruthenium or osmium metal carbene complexes that possesses metal centers that are formally in the +2 oxidation state, have an electron count of 14, are tetra-coordinated, and are of the general formula II.

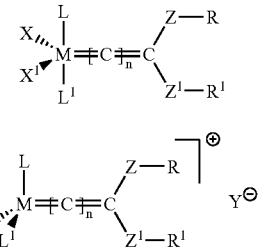

wherein:

M is ruthenium or osmium;

n is an integer between 0–5;

L and $L^1$ are each independently any neutral electron donor ligand;

R, $R^1$, and $R^2$ are each independently hydrogen or any hydrocarbyl or silyl moiety;

X and $X^1$ are each independently any anionic ligand;

Y is any noncoordinating anion;

Z and $Z^1$ are each independently any linker selected from the group nil, —O—, —S—, —NR²—, —PR²—, —P(=O) R²—, —P(OR²)—, —P(=O)(OR²)—, —C(=O)—, —C(=O)O—, —OC(=O)—, —OC(=O)O—, —S(=O)—, or —S(=O)₂—; and wherein any two or more of X, $X^1$, L, $L^1$, Z, $Z^1$, R, $R^1$, and $R^2$ may be optionally joined together to form a multidentate ligand and wherein any one or more of X, $X^1$, L, $L^1$, Z, $Z^1$, R, $R^1$, and $R^2$ may be optionally linked chemically to a solid or glassy support.

In various embodiments of these catalysts, L and $L^1$ are each independently selected from the group consisting of phosphine, sulfonated phosphine, phosphite, phosphinite, phosphonite, arsine, stibine, ether, amine, amide, imine, sulfoxide, carbonyl, carboxyl, isocyanide, nitrosyl, pyridine, quinoline, thioether, and nucleophilic carbenes of the general formula III:

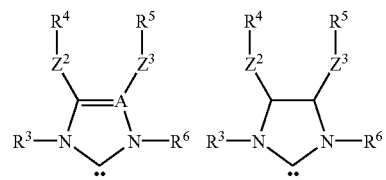

wherein:

A is either carbon or nitrogen;

$R^3$, $R^4$, $R^5$, and $R^6$ are each independently hydrogen or any hydrocarbyl moiety; except that in the case where A is nitrogen $R^5$ is nil;

$Z^2$ and $Z^3$ are each independently any linker selected from the group nil, —O—, —S—, —NR²—, —PR²—, —P(=O) R²—, —P(OR²)—, —P(=O)(OR²)—, —C(=O)—, —C(=O)O—, —OC(=O)—, —OC(=O)O—, —S(=O)—, or —S(=O)₂—, except that in the case where A is nitrogen $Z^3$ is nil; and $Z^2$, $Z^3$, $R^4$, and $R^5$ together may optionally form a cyclic optionally substituted with one or more moieties selected from the group consisting of $C_1$–$C_{10}$ alkyl, $C_1$–$C_{10}$ alkoxy, aryl, and a functional group selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

In other embodiments, L and $L^1$ are each a phosphine of the formula $PR^7R^8R^9$, where $R^7$, $R^8$, and $R^9$ are each independently any hydrocarbyl moiety, particularly aryl, primary $C_1$–$C_{10}$ alkyl, secondary alkyl or cycloalkyl. In still other embodiments, L and $L^1$ are selected from the group consisting of —P(cyclohexyl)$_3$, —P(cyclopentyl)$_3$, —P(isopropyl)$_3$, —P(butyl)$_3$, and —P(phenyl)$_3$.

In alternate embodiments, L is a phosphine and $L^1$ is a nucleophilic carbene of the general formula III. Preferably, L is selected from the group consisting of —P(cyclohexyl)$_3$, —P(cyclopentyl)$_3$, —P(isopropyl)$_3$, —P(butyl)$_3$, and —P(phenyl)$_3$ and $L^1$ is selected from the group consisting of:

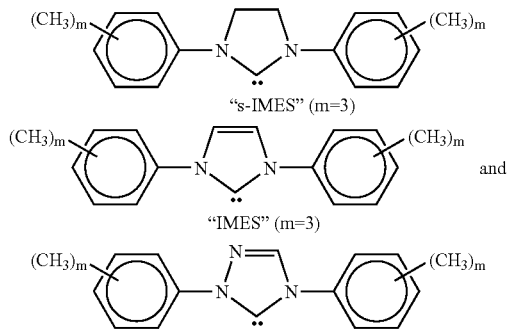

wherein m is an integer between 0 and 5.

Relating to R and $R^1$–$R^9$, examples of hydrocarbyl moieties include, but are not limited to, the group consisting of $C_1$–$C_{20}$ alkyl, $C_3$–$C_{20}$ cycloalkyl, $C_2$–$C_{20}$ alkenyl, $C_2$–$C_{20}$ alkynyl, aryl, heteroaryl, aralkyl, or alkaryl. Examples of silyl moieties include, but are not limited to, the group consisting of tri(hydrocarbyl)silyl, tri(hydrocarbyloxy)silyl, or mixed (hydrocarbyl)(hydrocarbyloxy)silyl. Optionally, each of the R, $R^1$ or $R^2$ substituent groups may be substituted with one or more hydrocarbyl or silyl moieties, which, in turn, may each be further substituted with one or more groups selected from a halogen, a $C_1$–$C_5$ alkyl, $C_1$–$C_5$ alkoxy, and phenyl. Moreover, any of the catalyst ligands may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen. In addition, any or all of R, $R^1$ and $R^2$ may be joined together to form a bridging or cyclic structure.

In various embodiments of these catalysts, the R substituent is hydrogen and the $R^1$ substituent is selected from the group consisting $C_1$–$C_{20}$ alkyl, $C_2$–$C_{20}$ alkenyl, aryl, alkaryl, aralkyl, trialkylsilyl, and trialkoxysilyl. In other embodiments, n equals 0, 1 or 2 and the $R^1$ substituent is phenyl, t-butyl or vinyl, optionally substituted with one or more moieties selected from the group consisting of $C_1$–$C_5$ alkyl, $C_1$–$C_5$ alkoxy, phenyl, and a functional group. In yet other embodiments, n equals 0 or 1 and $R^1$ is phenyl, t-butyl, or vinyl substituted with one or more moieties selected from the group consisting of chloride, bromide, iodide, fluoride, —NO$_2$, —NMe$_2$, methyl, methoxy and phenyl.

In various embodiments of these catalysts, X and $X^1$ are each independently hydrogen, halide, or one of the following groups: $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, arylsulfonate, $C_1$–$C_{20}$ alkylsulfonate, $C_1$–$C_{20}$ alkylthiol, aryl thiol, $C_1$–$C_{20}$ alkylsulfonyl, or $C_1$–$C_{20}$ alkylsulfinyl. Optionally, X and $X^1$ may be substituted with one or more moieties selected from the group consisting of $C_1$–$C_{10}$ alkyl, $C_1$–$C_{10}$ alkoxy, and aryl which in turn may each be further substituted with one or more groups selected from halogen, $C_1$–$C_5$ alkyl, $C_1$–$C_5$ alkoxy, and phenyl. In other embodiments, X and $X^1$ are halide, benzoate, $C_1$–$C_5$ carboxylate, $C_1$–$C_5$ alkyl, phenoxy, $C_1$–$C_5$ alkoxy, $C_1$–$C_5$ alkylthiol, aryl thiol, aryl, and $C_1$–$C_5$ alkyl sulfonate. In still other embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In alternate embodiments, X and $X^1$ are each chloride, bromide, or iodide. In addition, the X and $X^1$ together may comprise a bidentate ligand.

Y may be derived from any tetra-coordinated boron compound or any hexa-coordinated phosphorus compound. Representative boron compounds include $BF_4^-$, $BPh_4^-$, and fluorinated derivatives of $BPh_4^-$. Representative phosphorous compounds include $PF_6^-$ and $PO_4^-$. The noncoordinating anion may be also any one of the following: $ClO_4^-$, $SO_4^-$, $NO_3^-$, $OTeF_5^-$, $F_3CSO_3^-$, $H_3CSO_3^-$, $CF_3COO^-$, $PhSO_3^-$, or $(CH_3)C_6H_5SO_3^-$. Y may be also derived from carboranes, fullerides, and aluminoxanes.

Exemplary metal catalysts include, but are not limited to: $(PCy_3)_2Cl_2Ru=CHPh$, $(PCy_3)_2Cl_2Ru=CH—CH=CMe_2$, $(PCy_3)_2Cl_2Ru=C=CHCMe_3$, $(PCy_3)_2Cl_2Ru=C=CHSiMe_3$, $(PCy_3)(s\text{-IMES})Cl_2Ru=CH—CH=CMe_2$, $(PCp_3)_2Cl_2Ru=CH—CH=CMe_2$, $(PCp_3)_2Cl_2Ru=C=CHPh$, $(PCp_3)(s\text{-IMES})Cl_2Ru=CH—CH=CMe_2$, $(PPh_3)(s\text{-IMES})Cl_2Ru=C=CHCMe_3$, $(PPh_3)_2Cl_2Ru=C=CHSiMe_3$, $(P(i\text{-Pr})_3)_2Cl_2Ru=C=CHPh$, $(PPh_3)(s\text{-IMES})Cl_2Ru=C=CHSiMe_3$, $(PBu_3)_2Cl_2Ru=C=CHPh$, $(PPh_3)(s\text{-IMES})Cl_2Ru=CH—CH=CMe_2$, $(PCy_3)(s\text{-IMES})Cl_2Ru=C=CHPh$, $(PCp_3)(s\text{-IMES})Cl_2Ru=C=CHPh$, $(PBu_3)(s\text{-IMES})Cl_2Ru=C=CHPh$, $(PCy_3)(s\text{-IMES})Cl_2Ru=CHPh$, $(PBu_3)(s\text{-IMES})Cl_2Ru=CH—CH=CMe_2$, $(PCy_3)(IMES)Cl_2Ru=CHPh$, $(PPh_3)_2Cl_2Ru=C=CHCMe_3$, $(PCy_3)(IMES)Cl_2Ru=C=CHCMe_3$, $(PCp_3)(IMES)Cl_2Ru=CH—CH=CMe_2$, and $(PBu_3)(ImES)Cl_2Ru=C=CHPh$.

By varying the catalyst employed for a particular metathesis reaction within the invention, it may be possible to increase product yields and reduce reaction times. For example, if a catalyst exhibiting greater thermal stability than Ru* is selected, it should be possible to increase the reaction rate by increasing the temperature of the reaction mixture without the catalyst decomposing. Other reaction conditions, such as choice of solvent (e.g., solvent with higher boiling points might be used) might be varied as well. Based on the teaching herein, suitable catalysts for particular metathesis condensation reactions can be determined by examining the catalytic activity of a number of different catalysts in the particular reaction, and selecting as suitable those displaying any catalytic activity. Those particular catalysts that display higher levels of activity are preferred, and those that display the highest levels of activity are more preferred.

Solvents and Other Reactants

Although many embodiments of the invention employ reactions performed without a solvent or co-solvent (e.g., those using liquid monomers can be performed neat), one or more solvents can be added to the reaction mixture to help dissolve the substrate and catalyst of the reaction mixture into a homogeneous state (e.g., substrate and catalyst dissolved together in a liquid phase). As described in the Examples section below, solvent(s) can also be added to reactions in progress to reduce the viscosity of the reaction mixture to a sufficient extent to allow the reaction to continue (e.g., where the production of higher molecular weight polymers is desired). Those solvents capable of both dissolving the constituents of the process and not significantly hindering the reaction (e.g., by attacking the catalyst) are acceptable for use with the invention. Typically, the choice of the solvent depends upon the particular constituents used, as, for example, one particular solvent may be capable of dissolving one set of constituents but not another. As such, many types of solvents can be used with this process. A non-exhaustive list of examples of solvents that might be used include various hydrocarbon-based solvents such as aliphatic hydrocarbons (e.g., hexane and heptane), aromatic hydrocarbons (e.g., benzene, toluene, naphthalene, phenol, and aniline), alicyclic and heterocyclic hydrocarbons (e.g., cyclohexane), cyclic ethers, and derivatives of any of the foregoing (e.g., halogenated derivatives of the foregoing such as chloroform and dichloromethane). In some of the experiments presented below, dichloromethane and chloroform were used as solvents. Mineral oil was also successfully used in reactions similar to those described below, and is preferred for its low volatility. Mixtures of two or more solvents might also be used.

The suitability of a particular solvent for a particular reaction can be determined empirically by the methods taught herein. For example, a given solvent can be selected for a particular reaction based on the ability of the solvent to dissolve the constituents of the reaction mixture and the boiling point of the solvent (which should be above the temperature of the reaction). A candidate solvent can be used in the reaction to determine whether it is suitable.

The amount of solvent used in a particular application of the invention will vary depending on the particular substrate, catalyst, and reaction conditions employed. The amount of solvent used should be in excess of the amount needed to (a) dissolve the substrate and catalyst under the reaction conditions selected (e.g., at room temperature) and (b) allow that reaction to proceed. Based on the results obtained below, a solvent to substrate-catalyst ratio of between about 1 to 2 mL:0.1 to 1000 mg is expected to be an appropriate ratio for carrying out the reaction. Preferred substrate-catalyst ratios are presented in the Examples section below.

In addition to solvents, other reagents might be added to the reaction mixture in an attempt to optimize the reaction. For example, in some of the ADMET reactions performed using linear amino alcohol containing dienes as the monomers and Ru* as the catalyst, the evolution of ethylene ceased after a short period of time leading to low molecular weight oligomers. $^1$H NMR analysis showed the presence external olefin end groups but very little internal olefin formation, indicating that a dynamic intramolecular complexation of the ruthenium catalyst had slowed the polycondensation kinetics considerably. This complexation can be obviated to some extent with the addition of a Lewis acid stronger than the ruthenium catalyst such as titanium isopropoxide. As discussed in the Examples section below, the use of 2.5 mol % Ti(OiPr)$_4$ produced a polymer with a molecular weight of approximately 10 times that of the polymer without Ti(OiPr)$_4$ as determined by $^1$H NMR using end group analysis. However, a new multiplet signal due to olefin isomerization was observed.

Monomer:Catalyst Ratios

The efficiency of the subject metathesis condensation can be adjusted by varying the amount of monomer per amount of catalyst used in the reaction. The monomer:catalyst ratio used in the invention can be any that result in the formation of the desired polymer product. This ratio will vary widely depending on factors such as the particular catalyst selected, the particular reaction to be catalyzed, the quantity or concentration of monomer present, and the particular reaction conditions (e.g., pressure, temperature, presence and type of solvent, etc.) utilized. Such monomer:catalyst ratios can be determined empirically by comparing the quality and quantity of products produced using a range of different ratios. Those that produce more of the product are typically preferred; and those that produce the most product are typically the most preferred.

In general, for the polymerization of an diene molecule functionalized with an amino acid, amino alcohol, or polypeptide, the ratio of monomer to catalyst (mol:mol) can be varied from about 1:1 to 1,000,000:1 (e.g., 0.9:1; 1:1; 2:1; 3:1; 4:1; 5:1; 10:1; 20:1; 30:1; 40:1; 50:1; 75:1; 100:1; 150:1; 200:1; 300:1; 400:1; 500:1; 750:1; 1000:1; 10,000:1; 50,000:1; 100,000:1, 500,000:1; and 1,000,000:1). The use of too much catalyst might be disadvantageous from an economic standpoint (catalysts generally being relatively expensive), while the use of too little catalyst might be disadvantageous from an efficiency standpoint (i.e., too little product results). Accordingly, a preferred monomer:catalyst ratio is also one that produces the most economically efficient reaction (e.g., about 50:1, 100:1, 200:1, 300:1, 400:1, 500:1, 600:1, 700:1, 800:1, 900:1, or 1000:1 for the reactions described below).

Reaction Conditions

A variety of different reaction conditions will result in the polymerization of a diene molecule functionalized with an amino acid, amino alcohol, or polypeptide. The particular conditions to be employed will vary depending on the particular diene monomer used, the particular catalyst used, and the monomer:catalyst ratio used. Suitable conditions are described below. Other suitable conditions, however, are within the invention and can be determined empirically using the information provided below.

Temperature

Methods within the invention include a step of placing the monomer/catalyst mixture under conditions that result in the production of the polymer product in the reaction mixture. Although many of the reactions within the invention can proceed at room temperature, the step of placing the monomer/catalyst mixture under conditions that result in the production of the polymer product can include adjusting the temperature of the reaction mixture to a temperature suitable for the reaction to proceed. The particular temperature or range of temperatures chosen will vary according to several parameters including the particular reaction selected, the concentration of the reactants in the reaction mixture, the pressure of the reaction mixture, etc. Suitable temperatures can be determined by extrapolation from temperatures known to be optimal for reactions similar to those of the selected reaction (i.e., from conventional metathesis methods) to get a general range of suitable temperatures. Experiments utilizing reactions within the invention can then be performed, and the temperature can be varied around the extrapolated general range of suitable temperatures to identify suitable and/or optimal temperature(s) for the processes of the invention.

Generally, those temperatures at which the greatest amount of chemical product is produced or at which polymers of the desired molecular weight are formed are preferred. In some cases, those temperatures which do not necessarily result in the greatest amount of chemical product are preferred for other reasons (e.g., from an economic standpoint it may be preferred to run the reaction at lower temperatures to avoid the costs associated with heating a reaction mixture or to avoid decomposition of expensive catalysts). For many reactions, suitable temperatures range from about 10° C. to about 100° C. (e.g., 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101° C.), although this range can vary substantially.

For the metathesis condensation of monomers functionalized with amino acids or amino alcohols using the Ru* catalyst, reaction conditions including reaction temperatures ranging from about room temperature (e.g., 23° C.) to 75° C. have resulted in the production of polymer product. Reactions run at temperatures colder than about 23° C. are expected to produce polymer product as well, but at increasingly slower rates as the temperature is reduced (the reaction kinetics slowing with decreasing temperature). Reactions run at temperatures hotter than about 75° C. might also produce polymer product. In many cases, the product yield will decrease as the temperature increases due to the decomposition of thermally labile catalysts or loss of volatile solvents. In general, the maximum temperature at which the reaction can proceed is expected to be limited by the stability of the catalyst used under the specific reaction conditions employed. For a typical reaction in the invention, the temperature of the reaction is started at room temperature. As polymer product forms heat is gradually added (generally from up to 45–75° C.) to keep the reaction mixture at a suitable viscosity to allow the reaction to continue (i.e., to keep the polymer product in the melt while preventing decomposition of the catalyst).

Atmosphere

The reaction of the invention can be performed under any atmosphere that allows the reaction to proceed. For reactions employing catalysts such as Ru* that lose activity in the presence of oxygen, a de-oxygenated, inert atmosphere such as nitrogen ($N_2$) or argon (Ar) is preferred. To increase the rate of the reaction, the inert gas can be continually flowed over the mixture so that gaseous by-products (e.g., ethylene) of the reaction an be removed. For catalysts that lose activity in the presence of water, a dry atmosphere is preferred.

Pressure

Although the monomer/catalyst mixture according to the invention can react under standard atmospheric pressure to result in the production of the polymer product, methods within the invention might also include a step of adjusting the pressure of the reaction mixture to another pressure at which the reaction can proceed. The particular pressure or range of pressures chosen will vary according to several parameters including the particular reaction selected, the concentration of the components in the reaction mixture, the temperature of the reaction mixture, etc. Suitable pressures can be determined by extrapolation from pressures known to be optimal for reactions similar to those of the selected reaction (i.e., from conventional metathesis methods) to obtain a general range of suitable pressures. Experiments can then be performed with a reaction mixture of the invention in which the pressure is varied around the extrapolated general range of suitable pressures used in the conventional methods, to find the most optimal pressure(s) for the processes of the invention. For example, those pressures at which the greatest amount of desired polymer product is produced or those at which polymers of a desired molecular weight are produced might be optimal.

Although ADMET-mediated polymerization of a diene functionalized with an amino acid or amino alcohol can take place at pressures greater than atmospheric pressure, it is generally preferred to run the reaction at about standard atmospheric pressure (because no specialized containment is necessary) or less. Where a volatile product (e.g., ethylene) is produced, it may be preferred to run the reaction at less than standard atmospheric pressure (e.g., in vacuo, i.e., less than or equal to about $1\times10^{-3}$ mmHg, or at about 10, 25, 50, 100, 200, 300, 400, 500, 600, 700, 800, or 900 kPa), as removal of the evolved volatile product (e.g., ethylene) is expected to drive the reaction forward at a higher rate.

Duration

The duration of the reaction will depend upon the particular reaction and reaction conditions selected. Generally, the amount of time for the reaction to occur will vary from the time between (a) the initiation of the reaction and the first appearance of the desired chemical product and (b) the initiation of the reaction and the termination of chemical product synthesis (e.g., due to exhaustion of monomer or production of interfering by-products). Thus the reaction can last for less than a few seconds to more than several days. The reaction might even proceed continuously by continuous removal of desired product and by-products, and continuous replenishment of monomer, catalyst, and/or solvent. For ADMET-mediated polymerization of a diene functionalized with an amino acid or amino alcohol under the reaction conditions described below, the reaction generally lasts from a few hours to several days (e.g., 2 h, 3 h, 6 h, 12 h, 18 h, 1 d, 2 d, 3 d, 4 d, 5 d, 6 d, 7 d or more; see examples below). Generally, provided significant catalyst decomposition does not occur, the longer a particular reaction is run the larger the molecular weight of the polymer product that is formed. Thus, if a smaller polymer is desired, the reaction may be run for a shorter time than if a larger product is desired, and vice versa. Many of the products of the invention have favorable properties (e.g., rigidity) when they are greater than about 15,000 g/mol molecular weight. For the formation of these products, the time is takes to forms polymers of this size (at least about 4–5 days under the conditions described in the Examples) are preferred.

Products

The reactions described herein generally result in the production of an amino acid (or polypeptide)-containing polyolefin product in a reaction mixture that might also include unreacted monomer and the catalyst. By-products of the reaction might also be present. Gaseous ethylene, however, is typically removed from the reaction mixture by diffusion into the environment or removal by a vacuum source. The products remaining in the reaction mixture can be isolated by any suitable means and further purified by conventional methods. As described in more detail below, the Ru* catalyst can be removed from the reaction mixture using a tris(hydroxymethyl)phosphine solution to bind the catalyst, and washing the product with water.

Polymers made according to the invention can be characterized by conventional methods, e.g., gel permeation chromatography (GPC), differential scanning calorimetry (DSC), melting point analysis, nuclear magnetic resonance (NMR) analysis, etc.

Polymers made according to the invention can also be further processed to make various new products. For example, the amino acid-containing polymers produced in the reactions of the invention can be hydrogenated (e.g., to increase the crystallinity or melting point of the product) in the presence of high pressure hydrogen gas. See, Watson and Wagener, Macromolecules, 2000, 33:8963. Additionally, polymers of the invention might be deprotected, e.g., to increase water solubility.

Use of the Polymer Product

Functionalized polyolefins only require molecular weights between 10,000–20,000 g/mol to exhibit useful physical and mechanical properties, a molecular weight range similar to common polycondensation polymers such as nylon and polyester. The polymers possessing amino acid units in the backbone can be biodegradable (see Koyama et al, Macromolecules, 1998, 31:1495), while the polymers with the amino acid units pendant to the main chain will be hydrolytically stable. Consequently, two completely different types of materials can be created according to the methods of the invention. Altering the "regularity" of placement of the functional groups might also be performed (either via diene monomer design or copolymerization) to create polymers having exact molar concentration of amino acid (or polypeptide) groups. As the methods of the invention permit synthesis of polyolefins bearing peptide or polypeptide sequences. Thus polyolefin surfaces could be designed to achieve specific properties.

Based on their properties, the functionalized polymers prepared of the invention could be used to produce a broad range of commercially important products such as chromatography reagents (e.g., for use in separatory reagents), biomimetics, biodegradable synthetic polymers, and drug delivery agents. For example, the branched functionalized polymers of the invention could be used as tissue culture substrates or in microtiter plates or other substrates used in high throughput screening methods (e.g., to identify molecules that bind to particular peptides or polypeptides). Such polymers could also be used in an implantable medical device to modify the physiological response to the device. For example, such devices could be coated with polymers bearing peptides that alter biological responses (e.g., reduce scar or adhesion formation) or infection (e.g., by preventing adherence of bacteria to the device). In another application, by incorporating only one chiral species (L or D; or R or S) of an amino acid onto the backbone of a polymer of the invention, the polymer could also be used to resolve enantiomers in a racemic mixture or to identify ligands that preferably interact with one chiral species.

Linear copolymers made up of amino acid-based monomers and hydrocarbon-based monomers could be used to make materials that biodegrade more quickly than conventional carbon-based linear polymers (e.g., polyethylene). Such materials could be fashioned into films for use in packaging, bags, and the like, that would quickly be degraded (e.g., by chemical or microorganism-mediated processes) in landfills. Similarly, such materials could be fashioned into medical implants designed to slowly degrade within a body. For example, the material could be impregnated with a drug for sustained release. It might also be fashioned into a scaffolding for applications in tissue engineering. In addition, drugs having improved pharmacodynamics could be made by incorporating biologically active oligopeptides within such polymers (e.g., to reduce the rate of degradation of the oligopeptide).

EXAMPLES

Example 1

Synthesis of Linear Amino Alcohol Polymers

Referring to FIG. 1, the linear amino alcohol containing dienes shown as monomers 2 and 3 were used in ADMET polycondensation reactions using the Ru* catalyst at a 100:1 monomer to catalyst ratio. Ethylene evolved from the reaction mixture at the start of the reaction. This ceased after a short period of time leading to the formation of oligomers in the reaction mixture. The resulting oligomers 10 and 11 had $\overline{M}_n$'s of 900 and 930 g/mol respectively as determined by GPC, indicating that a trimer product formed in each reaction. $^1$H NMR spectra (unless otherwise indicated all $^1$H NMR spectra described herein were run in DMSO-$d_6$) of oligomers 10 and 11 showed external olefin end groups at 5.5–5.7 and 6.1–6.3 ppm with very little internal olefin formation at 5.7–5.9 ppm.

In these reactions, a dynamic intramolecular complexation of the catalyst likely slowed the polycondensation kinetics considerably. See, Ghosh, et al., Tetrahedron Lett. 1998, 39, 4651–4654; Choi et al., Chem. Int. Ed. 2001, 40, 1277–1279; Wright, D., Current Organic Chemistry 1999, 3, 211–240; Furstner, A. and Langemann, K. J. Am. Chem. Soc. 1997, 119, 9130–9136; and Patton et al., Macromolecules 1992, 25, 3862–3867. This complexation can be obviated to some extent with the addition of a Lewis acid stronger than the Ru* catalyst, such as titanium isopropoxide (Ti(OiPr)$_4$). For example, in these reactions, the use of 2.5 mol % Ti(OiPr)$_4$ produced a polymer with a molecular weight of approximately 10 times that of the polymer produced without Ti(OiPr)$_4$ as determined by $^1$H NMR using end group analysis. However, a new multiplet signal at 2.8–3.2 ppm was observed, indicating that a side reaction occurred. GPC analysis showed no increase of molecular weight compared to when no Ti(OiPr)$_4$ was used. After further examination of the $^1$H NMR spectrum, it was evident that the new peaks were due to olefin isomerization. Thus it is believed that heat permits Ti(OiPr)$_4$ to isomerize the olefins.

The observed intramolecular complexation can be avoided to some extent by extending the methylene run length in the monomer from two methylenes to three, as is the case for monomer 4 (FIG. 1). This monomer has an L-leucinol moiety with three methylenes between the carbonyls and the olefins, and it successfully polymerized to generate polymer 12, $\overline{M}_n$ of 4700 g/mol, as determined by GPC (Table 1). It appears that even with three methylene spacers between the olefins and carbonyls, complexation with the catalyst to form a 7-membered ring may still occur. Therefore, monomers 5 and 6 with eight methylene spacers between the olefins and the amino acid functionality were synthesized containing an L-valinol and an L-leucinol moiety, respectively (FIG. 1). These monomers easily polymerized with a 250:1 monomer:catalyst ratio producing polymers 13 and 14 with GPC $\overline{M}_n$'s of 27,000 and 33,000 g/mol, respectively.

TABLE 1

$M_n$ values were calculated by GPC versus polystyrene standards. Specific rotations were measured in $CH_2Cl_2$ at 25° C., where $[\alpha]_m$ is the specific rotation of the monomer and $[\alpha]_p$ is the specific rotation of the polymer.
The PDI listed in the table is the polydispersity of the polymers as determined by GPC analysis, and the $T_m$'s that are reported were determined by DSC.

| Monomer | Polymer | $[\alpha]_m$ (°) | $[\alpha]_p$ (°) | Mn (g/mol) | PDI | $T_m$ (° C.) |
|---------|---------|------------------|------------------|------------|------|--------------|
| 2       | 10      | −32              | —                | 900        | 1.49 | —            |
| 3       | 11      | −32              | —                | 900        | 1.13 | —            |
| 4       | 12      | −32              | −32              | 4,700      | 1.73 | —            |
| 5       | 13      | −34              | −20              | 27,000     | 1.77 | 29           |
| 6       | 14      | —                | −40              | 33,000     | 1.64 | —            |
| 7       | 15      | −13              | −64              | 31,000     | 2.02 | 114          |
| 8       | 16      | −13              | −7               | 26,000     | 2.10 | 135          |
| 9       | 17      | —                | —                | 21,000     | 1.70 | —            |

Example 2

Synthesis of Ester-Terminated Amino Acid Branched Polymers, and an Amide-terminated Amino Acid Branched Polymer Monomer 7 (FIG. 1) was synthesized containing an L-leucine methyl ester branch to evaluate the effect of positioning the amino acid moiety pendant (i.e., attached to the backbone) in the polymer. Polymerization was done in solution under an argon atmosphere; the Ru* catalyst was added to monomer 7 (100:1 monomer:catalyst ratio) followed by the addition of chloroform (0.5 mL). An argon purge removed the ethylene produced during polymerization. Refluxing the solution for about 5 days followed by solvent evaporation produced polymer 15. This polymer was redissolved in chloroform and refluxed with a tris(hydroxymethyl)phosphine solution (1 M in isopropanol, 20:1 equivalents of tris(hydroxymethyl)phosphine:catalyst) to remove the catalyst residue. See, Maynard, H. D. and Grubbs, R. H. Tetrahedron Letters 1999, 40, 4137–4140.

Figure 2:
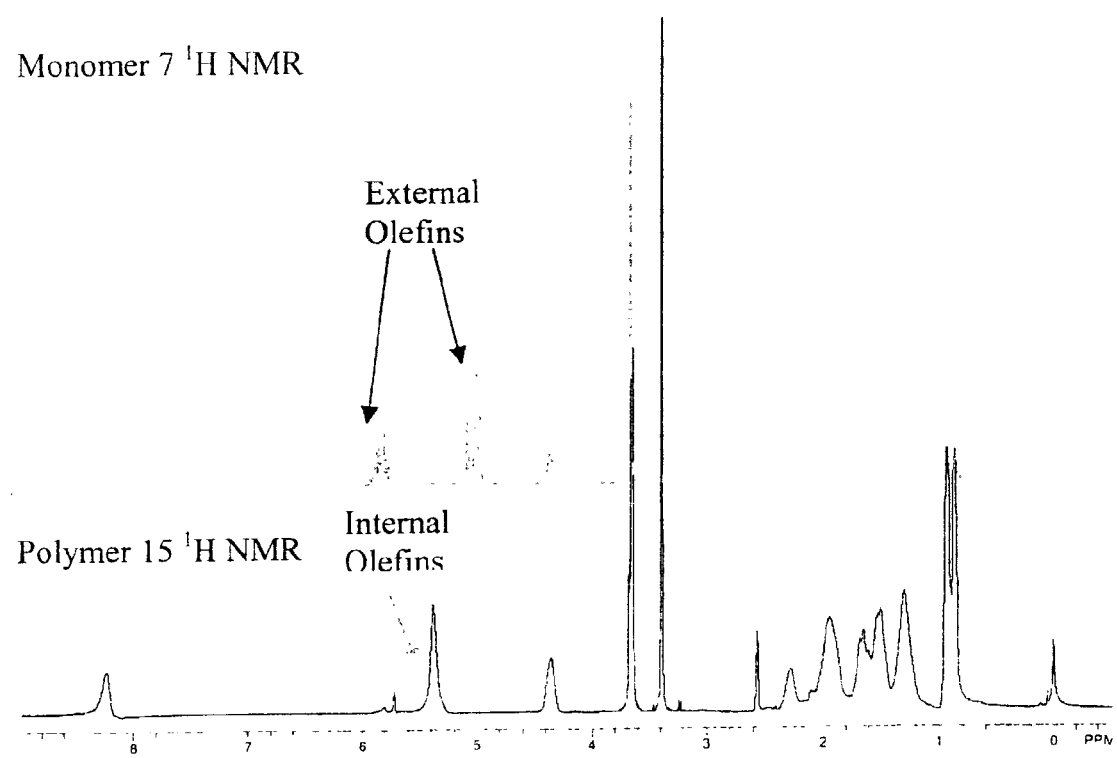
FIG. 2 is an 1H-NMR of monomer 7 and polymer 15 of the invention.

The polymer was then solvent cast onto a polytetrafluoroethylene plate yielding a strong, semicrystalline polymer film. FIG. 2 shows the $^1$H NMR of monomer 7 and polymer 15. The formation of an internal olefin at 5.4 ppm as well as the disappearance of the external olefins at 5.0 and 5.95 ppm is evident by the comparison of the two spectra, a spectral change that is typical for ADMET polymerizations. The polymer 15 produced had a $\overline{M}_n$=31,500 g/mol as determined by GPC. Thermal analysis confirmed that it was a semicrystalline material with a $T_m$=114° C.

Further, optical activity studies in methylene chloride showed that the polymer exhibited a 5-fold increase in optical activity over its monomer suggesting that a secondary structure may be formed by polymer 15 in solution. This change in optical activity was not noted in other polymers described herein. The enhanced optical activity of polymer 15 compared to its monomer may have resulted because monomer 7 (and not the other monomers tested) is asymmetric in methylene spacer units. This structural arrangement most likely leads to a difference in reactivity of the terminal olefin groups towards ADMET chemistry since as noted above, an olefin spaced two methylenes away from the amino acid group reacts more slowly than does an olefin spaced three or more olefins from the amino acid group. This difference in reactivity would result in a "preordering" of the backbone before complete polycondensation is observed. And this additional degree of order might lead to the generation of secondary structure within the macromolecule in solution.

Figure 3:
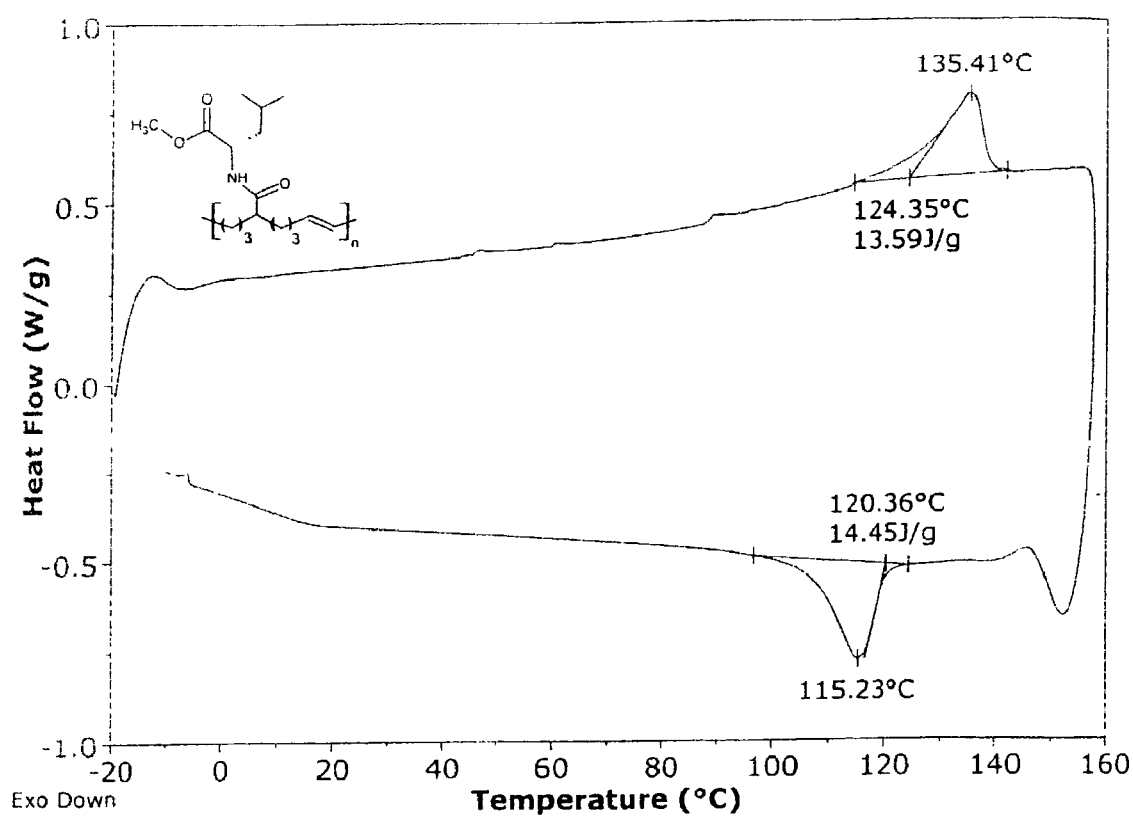
FIG. 3 is a DSC trace of polymer 16.
Figure 4:
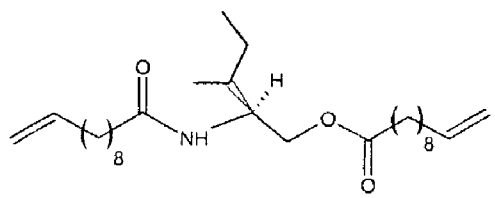
FIG. 4 is a schematic illustration of various other monomers useful in the invention.
Figure 4:
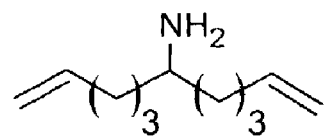
Figure 4:
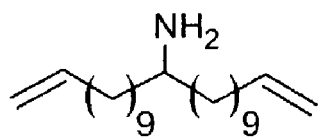
Figure 4:
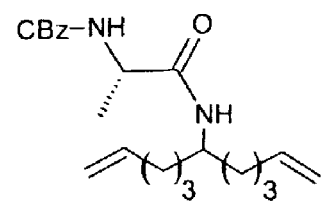
Figure 4:
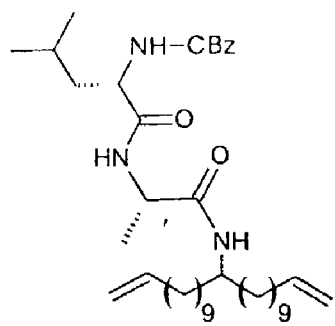
Figure 4:
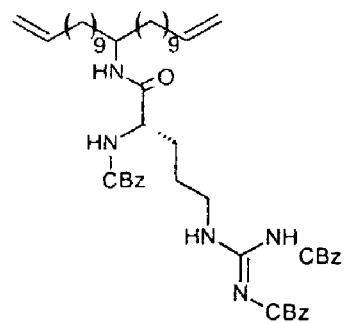

Monomer 8 was synthesized with an L-leucine methyl ester branch to further study the synthesis of polymers containing pendant amino acid moieties. This monomer was polymerized as described above to form polymer 16 which possesses an $\overline{M}_n$=26,100 g/mol as determined by GPC. It is important to note that this polymer, like all the others reported herein, is semicrystalline (FIG. 3). The polymer has a $T_m$=135° C. and, like polymer 15, appears to form a quite strong film.

Since the amino-terminus is more reactive with proteins than the carboxyl-terminus, monomer 9 was synthesized with a N-carbobenzyloxy (CBZ) protecting group on the terminal amine. This protecting group can be easily removed during the hydrogenation of the polymer backbone with Pd(C). Monomer 9 was polymerized to polymer 17 using a 100:1 ratio of monomer 9 to Ru* catalyst. This resulted in another strong film forming polymer with a $\overline{M}_n$21,000 g/mol. Polymer 17 has the ability to facilitate the attachment of peptide sequences to polyolefin materials.

Example 3

Synthesis and Polymerization of methyl N-[2-(3-butenyl)-6-heptenoyl]-L-leucinate (Monomer 7)

For the synthesis of monomer 7, 2-but-3-enylhept-6-enoic acid (the result of ACD/IUPAC Name v4.5 was obtained using the ACD/I-Lab service), nBuLi (34.6 mL, 0.0864 mol) was added dropwise to a stirred solution of THF (50 mL) at 20° C. To this solution, 5-hexenoic acid (4.042 g, 0.0388 mol) was then added dropwise. After the addition of 5-hexenoic acid was completed, hexamethylphosphoramide (HMPA) (7.89 g, 0.0441 mol) was added. The solution was transferred to an ice water bath and allowed slowly to warm up to 50° C. After two hours, the solution had turned from a dark yellow to a dark purple. The solution was then cooled back down to −20° C. using an isopropanol/$CO_2$ bath, and 5-bromopentene was added drop wise. The solution was allowed to warm up to room temperature slowly and was stirred for 14 hours. The solution was then heated for 1 hour at 40° C. Water (30 mL) was added to the mixture and the solution was acidified with 1 M HCl followed by extraction with $CH_2Cl_2$ (3 times with 30 mL). The organic layer was then washed with 10% HCl (2 times with 20 mL) followed by saturated NaCl (2 times with 20 mL). The solution was then concentrated via rotary evaporation. The crude product (5.70 g) was then purified by column chromatography using a 3:1 hexane:ethyl acetate solution. This yielded the pure product (1.2 g, 6.11 mmol, 15.7%).

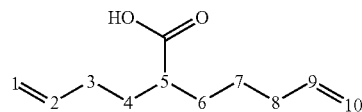

$^1$H NMR δ (multiplicity, coupling constant J in Hz., number of protons, assignment): 1.40–1.80(m, 8H, $C_4$—H, $C_6$—H, $C_7$—H), 2.00–2.20(m, 4H, $C_3$—H, $C_8$—H), 2.35–2.50(m, 1H, C$_5$—H), 4.90–5.10(m, 4H, C$_2$—H, C$_9$—H), 5.70–5.90(m, 2H, C$_1$—H, C$_{10}$—H), 11–12, (s, 1H, COOH).

To a stirred solution of 2-but-3-enylhept-6-enoic acid (1.2 g, 6.11 mmol; name obtained using ACD/IUPAC v4.5 using the ACD/I-Lab service) and EDC•HCL (1.17 g, 6.11 mmol) in CH$_2$Cl$_2$ (50 mL at 0° C.) was added methyl L-leucinate (0.900 g, 6.2 mmol). The reaction mixture was stirred at 0° C. for 2 hours. Then 4-dimethylaminopyridine (DMAP) (0.012 g, 0.6 mmol) was added and the solution was stirred at room temperature overnight. The solution was washed once with water (25 mL), once with NaHCO$_3$ (25 mL), and again with water (25 mL). The solution was purified via column chromatography (1:1 hexanes:ethyl acetate); concentrated via rotary evaporation; and then allowed to dry under vacuum (0.1 mmHg) overnight. This yielded the pure compound (1.05 g, 36%).

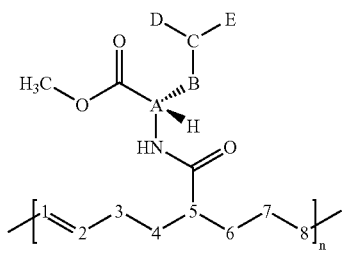

$^1$H NMR δ (multiplicity, coupling constant J in Hz., number of protons, assignment): 0.75–0.90(dm, 6H, C$_{C,D}$—H), 1.20–1.70(m, 9H, C$_{A,B,4,6,7}$—H), 1.85–2.10(m, 4H, C$_{3,8}$—H), 2.15–2.30(m, 1H, C$_5$—H), 3.60(s, 3H, OCH$_3$), 4.25–4.35(m, 1H, C$_A$—H), 4.85–5.05(m, 4H, C$_{1,10}$—H), 5.65–5.90(m, 2H, C$_{2,9}$—H), 8.20 (d, 1H, NH). C,H,N analysis: Theoretical C=69.86, H=10.10, N=4.53 Found C=69.95, H=10.36, N=4.39.

For the polymerization of methyl N-[2-(3-butenyl)-6-heptenoyl]-L-leucinate (monomer 7), methyl N-[2-(3-butenyl)-6-heptenoyl]-L-leucinate (0.50 g, 1.62 mmol) and Ru* (0.013 g, 0.016 mmol) were placed in a shlink flask with a stirring bar and a condenser. Enough CH$_2$Cl$_2$ was added as to make the waxy solid dissolve into a viscous liquid. Argon was then allowed to flow through the system which was vented through a bubbler. The solution was heated to 60° C. and stirred rapidly. When the solution started to become too viscous to stir another couple drops of CH$_2$Cl$_2$ were added. This was continued for 5 days. The CH$_2$Cl$_2$ was then removed via vacuum. This yielded a polymer with an average molecular weight=31,000 g/mol.

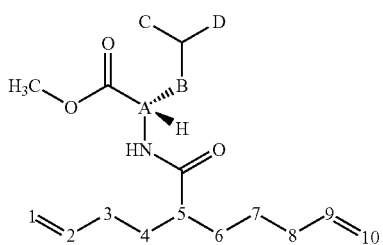

$^1$H NMR δ: 0.75–0.90(dm, 6H, C$_{C,D}$—H), 1.20–1.70(m, 9H, C$_{A,B,4,6,7}$—H), 1.85–2.10(m, 4H, C$_{3,8}$—H), 2.15–2.30 (m, 1H, C$_5$—H), 3.60(s, 3H, OCH$_3$), 4.25–4.35(m, 1H, C$_A$—H), 5.30–5.50(m, 2H, C$_{1,2}$—H), 8.20(m, 1H, NH). C,H,N analysis: Theoretical C=68.5, H=9.7, N=4.9, Found C=66.21, H=9.01, N=4.67.

Example 4

Synthesis and Polymerization of Monomer 8

Monomer 8 was synthesized by the same method described for monomer 7 in Example 3. The LDA solution was prepared as above using diisopropyl amine (11.2 g, 15.5 mL, 111 mmol), and nBuLi (2.5M in hexanes) (44 mL) in dry THF. The LDA solution was added to 6-heptenoic acid (5 mL, 4.73 g, 37 mmol) and HMPA (7.2 g, 7 mL, 40 mmol). To the stirred solution was added 5-pentenyl bromide (5.96 g, 4.74 mL, 0.04 mol). The workup was the same as in Example 3. Distillation yielded 2.3 g (32%) of the pure carboxylic acid diene.

The carboxylic acid diene (1.15 g, 5.86 mmol) was added to L-leucine methyl ester hydrochloride (1.07 g, 5.86 mmol), triethyl amine (0.59 g, 0.817 mL, 5.86 mmol), and EDC hydrochloride (1.25 g, 6.5 mmol). The solution was stirred at room temperature for 24 hours, and then refluxed for 1 hour. Evaporation yielded 1.27 g of a crude oil. Column chromatography with 3:1 hexanes:ethyl acetate yielded 420 mg (22%) product. Elemental analysis (C,H,N): Theory (70.55, 10.28, 4.33) Found (65.56, 10.26, 4.15).

Monomer 8 was polymerized similarly to the procedure described above in Example 3 for monomer 7. Briefly, a mixture of monomer 8 (281 mg, 0.687 mmol), Ru* (7 mg, 0.0082 mmol), and 1 mL CH$_2$Cl$_2$ were refluxed for 5 days. This yielded a polymer with an average molecular weight=26,000 g/mol.

Example 5

Polymerization of Monomer 2

Ru* (0.014 g, 0.016 mmol) was added to a stirred solution of titanium isopropoxide (0.012 g, 0.04 mmol) and monomer 2 (0.25 g, 0.88 mmol) in a glove box. The mixture was then placed under a vacuum (0.0001 mmHg). The reaction was started at room temperature, and the temperature was gradually raised to 70° C. to keep the solution at the right viscosity to allow good stirring over 5 days. The reaction produced a viscous oil. $^1$H NMR was in agreement with the monomer spectra, except the signals representing the external olefins were replaced by the internal olefin formed during olefin metathesis. Further examination with GPC analysis confirmed that only a trimer was formed during the polymerization. The determined molecular weight was 900 g/mol.

Example 6

Synthesis and Polymerization of Monomer 4

Monomer 4 was synthesized as previously described in Koyama, et al., Macromolecules 1998, 31, 1495–1500. Briefly, L-leucinol (0.910 g, 7.76 mmol) was added to hexenoic acid (1.868 g, 16.3 mmol) in CH$_2$Cl$_2$ (30 mL). To the stirred solution, 1-[3-(dimethylamino)propyl]-3-ethyl-carbodiimide hydrochloride (EDC) (3.12 g, 16.3 mmol) was added at 0° C., followed by the addition of dimethylaminopyridine (DMAP) (0.1991 g, 1.5 mmol). The urea salts were removed via filtration and the solutions was extracted with 1 M HCl (3×15 mL), saturated NaCl (3×15 mL), and drying over MgSO$_4$. The crude material was then purified via column chromatography to yield 0.4 g (16.7%). Elemental analysis (C,H,N): Theoretical (69.86, 10.10, 4.53) Found (69.22, 10.22, 4.61).

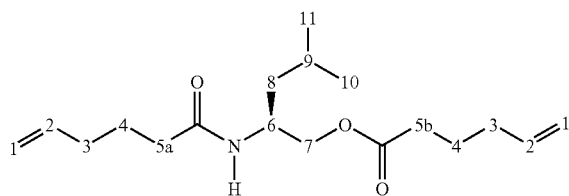

$^1$H NMR δ: 0.85(dd, 3H, $C_{10}$—H, $C_{11}$—H), 1.05–1.20(m, 3H, $C_8$—H, $C_9$—H), 1.50–1.70(m, 4H, $C_4$—H), 1.90–2.05 (m, 6H, $C_{5b}$—H, $C_3$—H), 2.25(t, 2H, $C_{5a}$—H), 3.80–4.10 (m, 3H, $C_6$—H, $C_7$—H), 4.90–5.08(m, 4H, $C_1$—H), 5.65–5.90(m, 2H, $C_2$—H).

To polymerize monomer 4, Ru* (0.0097 g, 0.0114 mmol, 1.0 mol %) was added to monomer 4, (0.35 g, 1.13 mmol) in a schlenk flask and stirred under vacuum (0.0001 mmHg) at 25° C. for 3 hours. Then the temperature was increased to 40° C. for 24 hours. The temperature was then slowly ramped to 75° C. over the next 96 hours. $^1$H NMR was in agreement with the spectra for 3 except for the external olefin peaks at 4.90–5.08 and 5.65–5.90 were replaced by an internal olefin signal at 5.20–5.60. The polymer had an average molecular weight=4,700 by GPC vs Polystyrene.

Example 7

Synthesis and Polymerization of Monomer 6

To a stirred solution of undecenyl acid (4.02 g, 22 mmol) in 50 mL $CH_2Cl_2$ was added L-leucinol (0.89 g, 7.3 mmol), dicyclohexylcarbodiimide (3.766 g, 18.3 mmol), and dimethylaminopyridine (DMAP)(0.17 g, 1.46 mmol) at 0° C. The urea salts that formed during the reaction were filtered off, and the solution was washed successively with 1$\underline{M}$ HCl (3×20 mL), $H_2O$ (1×20 mL), saturated $NaHCO_3$ (3×20 mL), $H_2O$ (1×20 mL), and saturated NaCl (1×20 mL). The organic layer was dried over $MgSO_4$. The mixture was then filtered and concentrated down to a viscous oil. The crude product was purified via flash column chromatography (3:1 hexanes:ethyl acetate) to yield 1.23 g (37.6%) of the pure product. C,H,N analysis: Theoretical (74.78, 11.43, 3.11) Found (74.78, 11.51, 3.14).

Ru* (15.0 mg, 0.017 mmol) was added to Monomer 6 (0.600 g, 1.377 mmol) in a schlenk flask with a stir bar. The flask was then placed into an oil bath at 50° C. and placed under partial vacuum. The release of ethylene was evident as soon as a slight vacuum was applied (i.e., rapid bubbling was observed). Only a slight vacuum was applied to try to prevent the monomer from splashing onto the side of the flask. After 5 hours the reaction proceeded to the point where the stir bar would no longer stir the polymer. At this point, the reaction temperature was raised to 70° C. and a full vacuum ($10^{-3}$ mmHg) was applied. After 24 hours, the reaction temperature was increased to 80° C. And after 48 hours the temperature was raised to 90° C. and allowed to set at this temperature for 72 more hours. After 120 hours, the reaction was placed back under atmospheric pressure and the polymer thus formed was dissolved into chloroform and solvent cast onto a polytetrafluoroethylene plate. At this point the polymer was a brown film. The polymer was then dissolved into 40 mL of chloroform and mixed with 44 mL (25 mol equivalents) of 1$\underline{M}$ tris(hydroxymethyl)phosphine (THP) in isopropanol to remove the ruthenium catalyst and the solution was refluxed for 24 hours. The solution was allowed to cool to room temperature and was washed with water (1×10 mL), 10% HCl (1×10 mL), and saturated $NaHCO_3$ (1×10 mL). The solution was dried over $MgSO_4$ and concentrated down to a solid. The polymer was dissolved into 1.5 mL of chloroform and solvent-cast onto polytetrafluoroethylene plate to form a solid that was now opaque in color. Average Mr=33,000 g/mol by GPC vs polystyrene.

Example 8

Synthesis and Polymerization of Monomer 21

Ethyl undecylenate (20 g, 94.2 mmol, 22.8 mL), NaOH (20 g, 0.5 mol) in 60 mL THF and 100 mL $H_2O$ was stirred under reflux conditions for 24 hours. The solution was allowed to warm to room temperature and diethyl ether (150 mL) was added. The solution was extracted 3 times with saturated sodium chloride solution (15 mL). The crude solution was at least 90% pure as determined by as chromatography (GC), and yielded 97% for the crude product. The crude carboxylic acid was used as is in the following reaction.

To a stirred solution of undecenyl acid (5 g, 27 mmol) in 50 mL $CHCl_3$ was added L-isoleucinol ((1.478 g, 12.6 mmol), 1,3-diisopropylcarbodiimide (DIC) (4.23 mL, 27 mmol), and (DMAP) (0.246 g, 2.16 mmol) at 0° C. The solution was allowed to gradually warm up to room temperature and was stirred for 24 hours. The reaction was worked up by first filtering off the urea salts that were formed during the reaction. The remaining organic solution was washed succesively with 1 $\underline{M}$ HCl (2×20 mL), saturated $NaHCO_3$ solution (2×20 mL), and saturated sodium chloride solution (1×20 mL). The solution was then dried over $MgSO_4$. The solution was filtered and then concentrated to yield a viscous oil. The crude product was purified using a Buchi Glaskugelrohr at 125° C. and 0.01 mmHg for 4 hours to remove the low boiling starting materials. The product was then further purified by column chromatography (3:1 Hexanes:Ethyl acetate) to yield 4.60 g (83% yield) of the desired compound.

Monomer 21 (1.0 g, 2.287 mmol) was added to Ru* (7.8 mg, 9.19×10$^{-3}$) and polymerized via the same technique described in Example 7 for monomer 6 except that in this case the polymerization was held at 50° C. for the first 24 hours, and then was allowed to rise to 70° C. for 120 hours. The catalyst was removed as described in Example 7, yielding a polymer with an average molecular weight=54,000 g/mol. This polymerization was run for 5, 6, 7, and 10 day lengths. Due to catalyst decomposition in longer runs, six days was the period in which optimal polymerization occured.

Example 9

Synthesis and Polymerization of Monomer 5 to Polymer 13 and Hydrogenation of Polymer 13

To a stirred solution of undecenyl acid (5 g, 27 mmol) in 50 mL $CHCl_3$ was added L-valinol (1.30 g, 12.6 mmol), 1,3-diisopropylcarbodiimide (DIC) (4.23 mL, 27 mmol), and dimethyl amino pyridine (DMAP) (0.246 g, 2.16 mmol) at 0° C. The solution was worked up and purified using the same method described in Example 7 yielding 4.72 g (88.6%).

Monomer 5 (1 g, 2.36 mmol) was mixed with Ru* (9.4 mg, 0.011 mmol) and polymerized and purified via the same method as described in Example 7 for monomer 6. This yielded a polymer (polymer 13) with an average molecular weight=27,000 g/mol.

Polymer 13 (480 mg, 1.13 mmol) was added to 10% Pd(C) (4.80 g, 4.52 mmol) in ethanol and the mixture was placed into a bomb reactor under 400 psi (about 2760 kPascal) $H_2$ at room temperature for 72 hours, after which the temperature was raised to 40° C. for 24 hours. Because the polymer was difficult to recover from the activated carbon, so it wa the carbon be stirred in boiling chloroform (300 mL) and filtered four times. This yielded the hydrogenated polymer (290 mg, 60%). $^1H$ NMR and $^{13}C$ NMR revealed that the polymer was approximately 97% hydrogenated.

Example 10

Synthesis and Polymerization of Monomer 9

The ketone was synthesized according to a procedure described in Watson and Wagener, Macromolecules, 2000, 33:3196–3201 ("Watson and Wagener"). Ethyl undecylenate (20 mL, 17.58 g, 83 mmol) was added dropwise to a stirred solution of KH (35% in mineral oil) (11.38 g, 99.6 mmol; 1.2 equivilents) in 100 mL dry tetrahydrofuran. Workup was the same as that described in Watson and Wagener The resulting yellow oil was then added to 31.1 g LiCl, 150 mL DMSO-$d_6$, and 7 mL water. The reaction was heated for 24 hours at 155° C. Workup was performed as described in Watson and Wagener, yielding 11 g of crude ketone.

The ketone (11 g, 0.03597 mol) was added to 150 mL methanol, $NH_4OH$ (27.61 g, 0.36 mol), one scoop of molecular sieves (4 Å), and $NaCNBH_3$ (11.3 g, 0.1799 mol), and the reaction was stirred for 48 hours at 40° C. The amine was purified by passing it through a pad of silica using 3:1 hexanes/ethyl acetate until all of the impurities had been removed as determined by thin layer chromatography (TLC), and then the pad was washed with MeOH to remove the amine. This 2.69 g of the pure amine resulted for an overall yield of 21%.

The amine (500 mg, 1.63 mmol) was added to CBZ-L-alanine (0.380 g, 1.7 mmol), diisopropyl carbodiimide (0.214 g, 1.7 mmol), and DMAP (0.017 g, 0.14 mmol) in $CHCl_3$ (20 mL) at 0° C. and allowed to warm slowly to room temperature overnight. $CHCl_3$ (25 mL) was added and the solution was extracted with saturated $NaHCO_3$ (3×15 mL), 1$\underline{M}$ HCl (3×15 mL), and saturated NaCl (3×15 mL). Evaporation of the solvent yielded yellow crystals. These were purified via 2 recrystalizations from MeOH. This yielded 0.396 g (47% yield) of white, crystalline monomer 9 with a melting point range of 81–83° C. Elemental analysis (C,H, N): Theory (74.95, 10.22, 5.46) Found (74.89, 10.38, 5.36).

Monomer 9 (362 mg, 0.71 mmol) was azeotropically distilled in 80 mL benzene for 24 hours. The solvent was removed and Ru* (6 mg, 0.007 mmol) was added along with 1 mL of dry $CHCl_3$. The solution was stirred at 55° C. for 5 days, with additional $CHCl_3$ being added as necessary due to evaporation of the solvent. The polymer was purified by the above solution and solvent-cast to yield a opaque, strong, crystalline material. The polymer had a n average molecular weight=21,000 g/mol.

Example 11

Synthesis of Monomer 22 (A 3-spacer Amine Branch)

To magnesium (4.89 g, 0.2 mol) in dry ether (100 mL) was added 5-bromopentene (25 g, 19.9 mL) in 60 mL of dry diethyl ether over a period of 10 minutes, and the solution was refluxed for two hours. The reaction mixture was then cooled to 0° C., and ethyl formate (5.64 g, 0.076 mol) was then added dropwise. The solution was then slowly warmed to room temperature and refluxed for 12 hrs. One hundred mL of 1$\underline{M}$ HCl was added and the solution was extracted with diethyl ether, washed with 30 mL of HCl (1$\underline{M}$) and brine (3×20 mL), and then dried over magnesium sulfate. The solvent was evaporated yielding 13.6 g of the crude alcohol.

To a 2 L round bottom flask containing 26 g of pyridinium-chlorocromate (PCC) and 26 g of celite in 100 mL of dichloromethane was added the crude alcohol (13.6 g) in 20 mL of dichloromethane. The reaction was stirred over 4 hours. Diethyl ether was then added and the mixture was filtered through a pad of silica gel. The solvent was evaporated yielding 12.96 g of the crude ketone.

To a 2 L round bottom flask containing the crude ketone (12.96 g) was added methanol (200 mL), ammonium acetate (60 g), and NaCNBH3 (25 g). This mixture was stirred at 400° C. for 48 hours. Water (200 mL) was added and the resulting mixture was extracted with diethyl ether. The organic layer was washed with 1$\underline{M}$ NaOH (2×50 mL) and brine (2×30 mL). It was then dried over magnesium sulfate and concentrated down to a viscous brown oil. The amine diene was purified by column chromatography (3:1:1 hexane/ethyl acetate/methanol) yielding the desired product 22 (m=9.275 g) an overall yield of 71.7%.

Example 12

Synthesis of Monomer 23 (A 9-spacer Amine Branched Diene)

Monomer 23 was synthesized according to the same techique described in Example 11 except using 11-bromo-1-pentene (25 g). This yielded 13 g, or 48% overall yield for the 3 steps.

Example 13

Synthesis of Monomer 24 (A 3-spacer Alanine)

A mixture of CBZ-protected L-alanine (0.5 g, 2.24 mmol), benzotriazole (0.36 g, 2.28 mmol), and EDC (0.429 g, 2.28 mmol) in chloroform (25 mL) was stirred at room temperature for 2 hours. Monomer 22 (0.372 g, 2.24 mmol) was then added and the solution was stirred overnight with an Argon purge. Water (30 mL) was added and the solution was extracted with chloroform (3×50 mL). The organic layer was washed successively with 1$\underline{M}$ HCl (2×15 mL), 1M NaOH (2×15 mL), and brine (2×20 mL), and then dried over magnesium sulfate. The solvent was evaporated, yielding 687 mg (83%) of the desired product.

Example 14

Synthesis of Monomer 25 (A CBZ-protected AlaLeu Dipeptide Diene)

To anhydrous DMF (25 mL) was added CBZ-LeucineAlanine (630 mg, 1.872 mmol), benzotriazole (0.306 g, 2 mmol), and DIC (0.32 mL, 2 mmol). This solution was stirred at room temperature for 2 hours. Monomer 23 (0.668 g, 2 mmol) was added and the solution was stirred for 12 hours. DMF was removed by heating the solution to 100° C. for 30 minutes under vacuum (1×10$^{-3}$ mm Hg) in a BUCHI high temperature distillation apparatus. The resulting solid was recrystallized from methanol, yielding 663 mg (54%) of the monomer 25.

Example 15

Synthesis and Polymerization of Monomer 26 (A 9-spacer-arginine)

To anhydrous DMF (25 mL) was added tri-CBZ-arginine (576 mg, 0.1 mmol), benzotriazole (17.4 mg, 1.14 mmol), and DIC (0.18 mL, 1.14 mmol). The solution was stirred at room temperature for 2 hours followed by the addition of monomer 23 (381 mg, 1.14 mmol) and stirring for 12 more hours. DMF was removed using a BUCHI high temperature distillation apparatus; the solution was warmed to 100° C. for 30 min under vacuum. The resulting solid was recrystallized from methanol, yielding 566 mg (64%) of monomer 26.

Monomer 26 (400 mg, 0.45 mmol) was mixed with catalyst 1 (7 mg, 0.008 mmol) in heavy mineral oil (2 mL) and stirred under vacuum ($10^{-3}$ mmHg) at 55° C. The solution was then precipitated once in methanol followed by a second precipitation in hexane. This yielded the pure polymer ($M_n$=5,000 by GPC).

Example 16

Synthesis and Polymerization of Monomer 27

Figure 5:
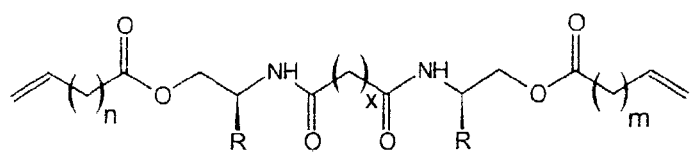
FIG. 5 is a schematic illustration of structures of various other monomers useful in the invention.
Figure 5:
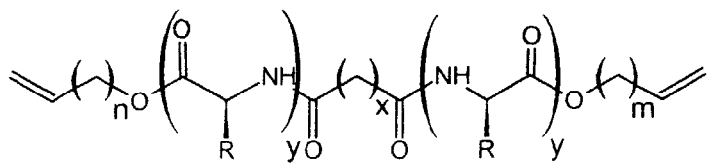
Figure 5:
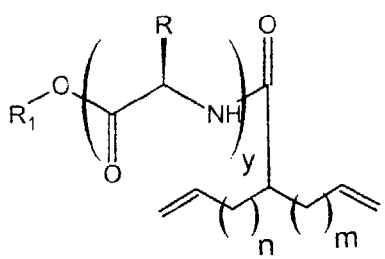
Figure 5:
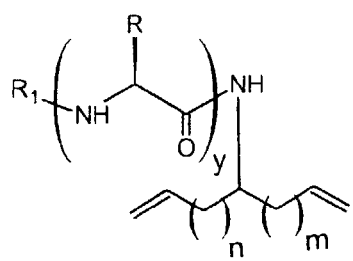
Figure 6:
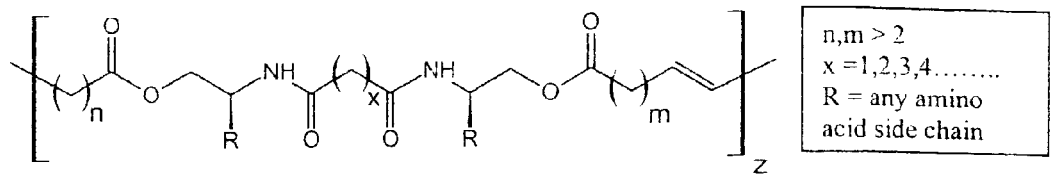
FIG. 6 is a schematic illustration of structures of various other polymers useful in the invention.
Figure 6:
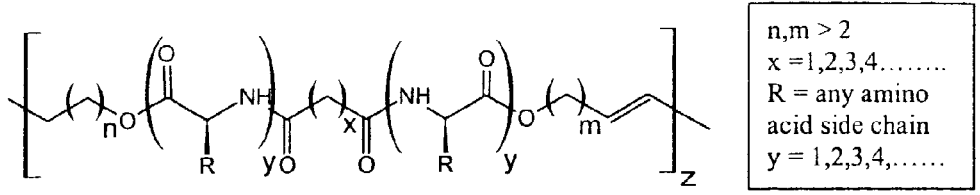
Figure 6:
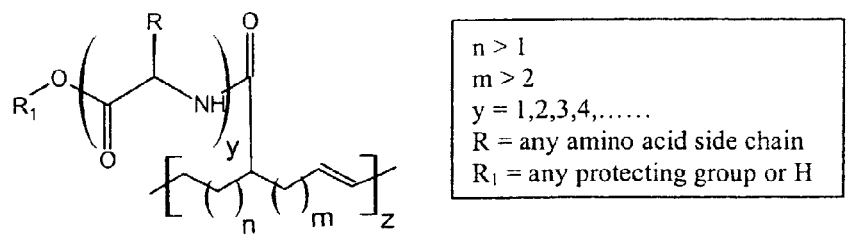
Figure 6:
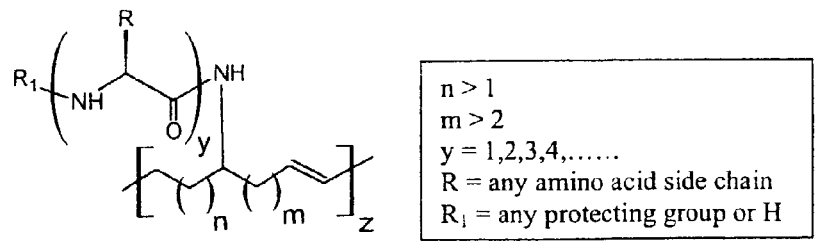

Molecules having the structure of Monomer 27 (See FIG. 5) are prepared by coupling a diacid with 2 equivalents of amino alcohol using a coupling agent (e.g., a conventional coupling agent such as EDC, DCC, or DIC). The resulting diol is coupled to 2 equivalents of the corresponding carboxylic acid diene using any suitable coupling agent (e.g., EDC, DCC, and DIC) to yield Monomer 27. Monomer 27 is contacted with a suitable catalyst (e.g., Ru*) under the appropriate reaction conditions (see above) to yield the corresponding Polymer 31 (See FIG. 6).

Example 17

Synthesis and Polymerization of Monomer 28

Molecules having the structure of Monomer 28 (See FIG. 5) are prepared by coupling 2 equivalents of a carboxy-protected amino acid using any suitable coupling agent (e.g., EDC, DCC, and DIC) to yield the dicarboxylic acid derivative. Alternatively, the protected amino acids (See Pennington, Michael W.; Dunn, Ben M. "Protocols in peptide synthesis" Humana Press Inc. Towtowa, N.J. 1994 for a list of protecting groups that can be used in the invention) are reacted with a diacid chloride to yield the dicarboxylic acid derivative. This product is then coupled to two equivalents of an alcohol diene using a conventional coupling agent (e.g., EDC, DCC, and DIC) to yield a molecule having the structure of Monomer 28. Monomer 28 is contacted with a suitable catalyst (e.g., Ru*) under the appropriate reaction conditions (see above) to yield the corresponding Polymer 32 (See FIG. 6).

Example 18

Synthesis and Polymerization of Monomers 29 and 30

Molecules having the structures of Monomers 29 or 30 (See FIG. 5) are prepared by coupling a protected peptide/polypeptide to the corresponding diene. See, e.g., the method described in Example 4 for a dipeptide. Monomers 29 or 30 are contacted with a suitable catalyst (e.g., Ru*) under the appropriate reaction conditions (see above) to yield the corresponding Polymers 33 or 34 (See FIG. 6).

Other Embodiments

This description has been by way of example of how the compositions and methods of invention can be made and carried out. Those of ordinary skill in the art will recognize that various details may be modified in arriving at the other detailed embodiments, and that many of these embodiments will come within the scope of the invention. Therefore, to apprise the public of the scope of the invention and the embodiments covered by the invention, the following claims are made.

What is claimed is:

1. A method of making an amino acid-containing polymer, the method comprising the steps of:
   (a) providing a monomer comprising a diene functionalized with an amino acid or amino alcohol;
   (b) forming a reaction mixture by contacting the monomer with an agent capable of catalyzing the polymerization of the monomer into a polymer wherein said agent is a ruthenium based catalyst or osmium metal carbene complex catalyst comprising metal centers that are in the +2 oxidation state and are of the general Formula I;

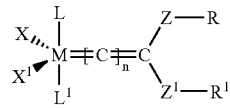

Formula I wherein
   M is ruthenium or osmium;
   n is an integer between 0–5;
   L and $L^1$ are each independently any neutral electron donor ligand;
   R, $R^1$, and $R^2$ are each independently hydrogen or any hydrocarbyl or silyl moiety;
   X and $X^1$ are each independently any anionic ligand;
   Z and $Z^1$ are each independently any linker selected from the group nil, —O—, —S—, —$NR^2$—, —$PR^2$—, —P(=O)$R^2$—, —P(O$R^2$)—, —P(=O)(O$R^2$)—, —C(=O)—, —C(=O)O—, —OC(=O)—, —OC(=O)O—, —S(=O)—, or —S(=O)$_2$—; and
   wherein any two or more of X, $X^1$, L, $L^1$, Z, $Z^1$, R, $R^1$, and $R^2$ may be optionally joined together to form a multidentate ligand and wherein any one or more of X, $X^1$, L, $L^1$, Z, $Z^1$, R, $R^1$, and $R^2$ may be optionally linked chemically to a solid or glassy support; and,
   (c) placing the reaction mixture under conditions that result in the formation of the polymer in the reaction mixture;
wherein the monomer has a structure:

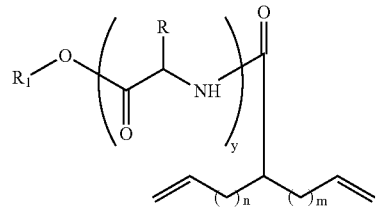

(monomer F)

wherein y is an integer greater or equal to 1, n is an integer greater than 1, m is an integer greater than 2, R is a moiety comprising a hydrogen atom and a carbon atom, and $R_1$ is any protecting group or H.

2. A method of making an amino acid-containing polymer, the method comprising the steps of:
(a) providing a monomer comprising a diene functionalized with an amino acid or amino alcohol;
(b) forming a reaction mixture by contacting the monomer with an agent capable of catalyzing the polymerization of the monomer into a polymer; and
(c) placing the reaction mixture under conditions that result in the formation of the polymer in the reaction mixture, wherein the agent capable of catalyzing polymerization is a ruthenium-based catalyst; and

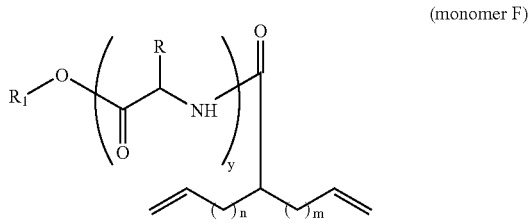

(monomer F)

wherein y is an integer greater or equal to 1, n is an integer greater than 1, m is an integer greater than 2, R is a moiety comprising a hydrogen atom and a carbon atom, and $R_1$ is any protecting group or H.

3. The method of claim 2, wherein the ruthenium-based catalyst is Ru*.

4. The method of claim 1, wherein n is equal to m.

5. The method of claim 1, wherein n is not equal to m.

6. The method of claim 1, wherein R comprises a moiety selected from: $CH_3$; $CH(CH_3)_2$; and $CH_2CH(CH_3)_2$.

7. The method of claim 1, wherein R comprises an amino acid side chain moiety, the amino acid being selected from the group consisting of: arginine, asparagine, aspartic acid, cysteine, glutamine, glutamic acid, glycine, histidine, isoleucine, lysine, methionine, phenylalanine, proline, serine, threonine, tryptophan, and tyrosine.

8. The method of claim 7, wherein R comprises a polypeptide.

9. The method of claim 1, wherein the step (c) of placing the reaction mixture under conditions that result in the formation of the polymer in reaction mixture comprises applying a vacuum force to the reaction mixture.

10. The method of claim 1, wherein the step (c) of placing the reaction mixture under conditions that result in the formation of the polymer in reaction mixture comprises flowing an inert gas over the reaction mixture.

11. The method of claim 1, wherein the step (c) of placing the reaction mixture under conditions that result in the formation of the polymer in reaction mixture comprises adding heat to the reaction mixture.

12. The method of claim 1, wherein the step (c) of placing the reaction mixture under conditions that result in the formation of the polymer in reaction mixture comprises adding a solvent to the reaction mixture.

13. The method of claim 1, further comprising a step (d) of hydrogenating the polymer.

* * * * *